United States Patent
Hobmeyr et al.

(10) Patent No.: US 8,656,938 B2
(45) Date of Patent: Feb. 25, 2014

(54) COMPRESSED GAS TANK SYSTEM WITH FAST FUELING ABILITY AT ANY VESSEL PRESSURE

(75) Inventors: Ralph Hobmeyr, Mainz-Kastel (DE); Jurgen Thyroff, Harxheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 312 days.

(21) Appl. No.: 12/955,206

(22) Filed: Nov. 29, 2010

(65) Prior Publication Data

US 2012/0132301 A1    May 31, 2012

(51) Int. Cl.
*F16K 31/02* (2006.01)

(52) U.S. Cl.
USPC ............... 137/12; 137/14; 137/487.5; 141/2; 141/94; 141/95; 141/192

(58) Field of Classification Search
USPC ............ 137/487.5, 12, 14, 487, 492.5; 141/2, 141/94, 95, 192
See application file for complete search history.

(56) References Cited

U.S. PATENT DOCUMENTS

| | | | |
|---|---|---|---|
| 5,406,988 A * | 4/1995 | Hopkins | 141/2 |
| 5,409,046 A * | 4/1995 | Swenson et al. | 141/11 |
| 5,868,176 A * | 2/1999 | Barajas et al. | 141/83 |
| 6,196,248 B1 * | 3/2001 | Myers et al. | 137/12 |
| 6,786,245 B1 * | 9/2004 | Eichelberger et al. | 141/4 |
| 7,325,561 B2 * | 2/2008 | Mathison et al. | 137/256 |
| 7,500,497 B2 * | 3/2009 | Michel et al. | 141/2 |
| 7,980,344 B2 * | 7/2011 | Kubo et al. | 180/68.1 |
| 8,122,918 B2 * | 2/2012 | Handa | 141/95 |
| 2002/0014277 A1 * | 2/2002 | Togasawa et al. | 141/95 |
| 2005/0056338 A1 * | 3/2005 | Hertzler et al. | 141/2 |
| 2005/0115630 A1 * | 6/2005 | Richey et al. | 141/2 |
| 2008/0035235 A1 * | 2/2008 | Kobayashi et al. | 141/94 |
| 2008/0138674 A1 * | 6/2008 | Pez et al. | 429/17 |
| 2009/0229701 A1 * | 9/2009 | Allidieres et al. | 141/2 |

* cited by examiner

*Primary Examiner* — John Rivell
*Assistant Examiner* — Minh Le
(74) *Attorney, Agent, or Firm* — Dinsmore & Shohl LLP

(57) ABSTRACT

A method of fueling with compressed gas is described. In one embodiment, the method includes providing a supply of compressed gas; providing a storage tank with a fueling line, and a nozzle in the fueling line, the nozzle movable between at least a flow reduction position and a full fuel flow position; initiating fueling from the supply of compressed gas with the nozzle in the flow reduction position for a predetermined time or until a minimum pressure is obtained; when the predetermined time or the minimum pressure is obtained, moving the nozzle to the full fuel flow position; and fueling the storage tank from the supply of compressed gas with the nozzle in the full fuel flow position until fueling is completed. A vehicle incorporating the nozzle is also disclosed.

18 Claims, 3 Drawing Sheets

COMPRESSED GAS TANK SYSTEM WITH FAST FUELING ABILITY AT ANY VESSEL PRESSURE

BACKGROUND OF THE INVENTION

The invention relates generally to fueling of compressed gas tanks, and more particularly, to methods and apparatus for safe fueling of compressed gas tanks.

A key component in a high pressure storage system for vehicle applications, such as hydrogen, or compressed natural gas (CNG), is the tank vessel. One type of tank vessel for storing compressed gas is a made of a fiber composite. Fiber composite vessels are desirable because they have a good storage to weight ratio. They typically have two layers: an outer layer, made of a carbon fiber matrix for example, that is designed to bear the mechanical load, and an inner layer, or liner, made of a bubble of plastic or aluminum, that is designed to prevent leaking.

The geometry of the inner liner and the fiber matrix layer are usually different for material and process reasons. The inner layer generally cannot withstand stress forces. To ensure that the liner is firmly supported by the outer layer, a minimum pressure should be maintained at all times. At pressures below the minimum pressure, for example less than about 20 bar, the two layers may separate from each other. If fuel is introduced into the vessel quickly under high pressure below the minimum pressure, the inner liner will bump against the fiber matrix layer very hard. The liner could rupture, and the contents would flow through the outer layer into the environment. In addition, gas trapped in the gap between the two layers can damage the liner and/or the fiber matrix layer.

Tank pressure evaluation has a certain tolerance, which increases over time. For example, the tolerance chain is the sum of several components and the converter. The tolerance for the P-transducer includes the A/D converter, the temperature compensator, and the D/A converter, which could be ±13.5 bar, for example. The tolerance for the vehicle controller could be ±18 bar, for example. Thus, the signal tolerance would be 31.5 bar, for example. The degradation over time needs to be considered also, which could be ±2.25 bar/yr, for example. Thus, for a 4 year old p-transducer, the tolerance would be the sum of these, or ±40.5 bar, for example.

The worst case tolerance margin has to be added to the signal tolerance along with a safety margin. Thus, for reasons of safety, hydrogen release may need to be stopped at a tank pressure of 65 bar by the vehicle controller (e.g., 20 bar minimum pressure+31.5 signal tolerance+9 bar degradation+ 4.5 bar safety margin=65 bar). However, at the calculated shutdown pressure, the "real" tank pressure could be any value between 20 bar and 105 bar, as shown in FIG. 1. Therefore, in all non-worst case situations, the worst case tolerance margin results in a reduced usable hydrogen mass and thus a reduced vehicle range of up to 14%.

Typically, the driver of the vehicle fuels at a filling station. Some fueling stations have the ability to recognize the vessel filling grade, while others do not. If the fueling station has an infrared (IR) interface, a computer, and mapping, the fueling station can control the proper fueling. The vehicle storage tank is connected to the filling nozzle of the station and creates a "short cut" between the empty vessel and the 875 bar pressure of the station. The "short cut" between the empty vessel and the 875 bar source creates a very strong pressure jump and very high gas flow. A slow fill has a reduced flow compared with the regular fast fill. Presently, slow fill is only possible at a service hub with trained personnel and special equipment ($H_2$ bottle, flow restrictor, pressure gauge).

Furthermore, it is believed that fast filling has been done improperly in some situations, e.g., without knowledge, without tracing, and/or without instrumentation.

SUMMARY OF THE INVENTION

One aspect of the invention is a method of fueling with compressed gas. In one embodiment, the method includes providing a supply of compressed gas; providing a storage tank with a fueling line, and a nozzle in the fueling line, the nozzle movable between at least a flow reduction position and a full fuel flow position; initiating fueling from the supply of compressed gas with the nozzle in the flow reduction position for a predetermined time or until a minimum pressure is obtained; when the predetermined time or the minimum pressure is obtained, moving the nozzle to the full fuel flow position; and fueling the storage tank from the supply of compressed gas with the nozzle in the full fuel flow position until fueling is completed.

Another aspect of the invention is a vehicle fueled by compressed gas. In one embodiment, the vehicle includes a fuel tank with a fueling line, a nozzle in the fueling line flow, the nozzle movable between at least a flow reduction position and a full fuel flow position, and a controller controlling the nozzle.

DETAILED DESCRIPTION OF THE INVENTION

The present invention provides a safe pressure increase in all fueling situations because the vehicle controls the filling mode, rather than the fueling station. Below a minimum pressure level, a slow fill is done. A valve restricts the filling with a defined orifice. The slow filling is done for a specified period, for example about 20 seconds, or until a minimum pressure is obtained. After that, the fast fill follows. In cases without knowledge of the vessel filling, the slow fill is done automatically. If the storage vessel has the required minimum pressure level initially, the fast fill can be done from beginning.

The present invention can provide safe fueling in situations including, but not limited to, very low pressure situations, where the filling grade of the vessels is not known, and fueling stations with damaged communication between the vehicle and the refueling station.

The present invention can have one or more advantages. It can provide safe fueling at any pressure, not only above the minimum pressure. Consequently, the driving range can be increased, e.g., up to about 14%. The tolerance chain of p-signal has no effect on the present invention. Regular fueling operation can be used, even if driver runs the vehicle beyond the low level warning so that there is less than the minimum pressure. There are fewer requirements for the fueling station because slow and fast fueling are controlled by the vehicle, not the fueling station. Slow fill is permitted on any fueling station; no trained personnel or special equipment are required. At the beginning of fueling, the flow restrictor reduces the flow at low pressure for a predetermined time or until a minimum pressure is obtained. However, the fueling time will increase slightly, and an additional nozzle and optional associated controls are required.

Figure 1:
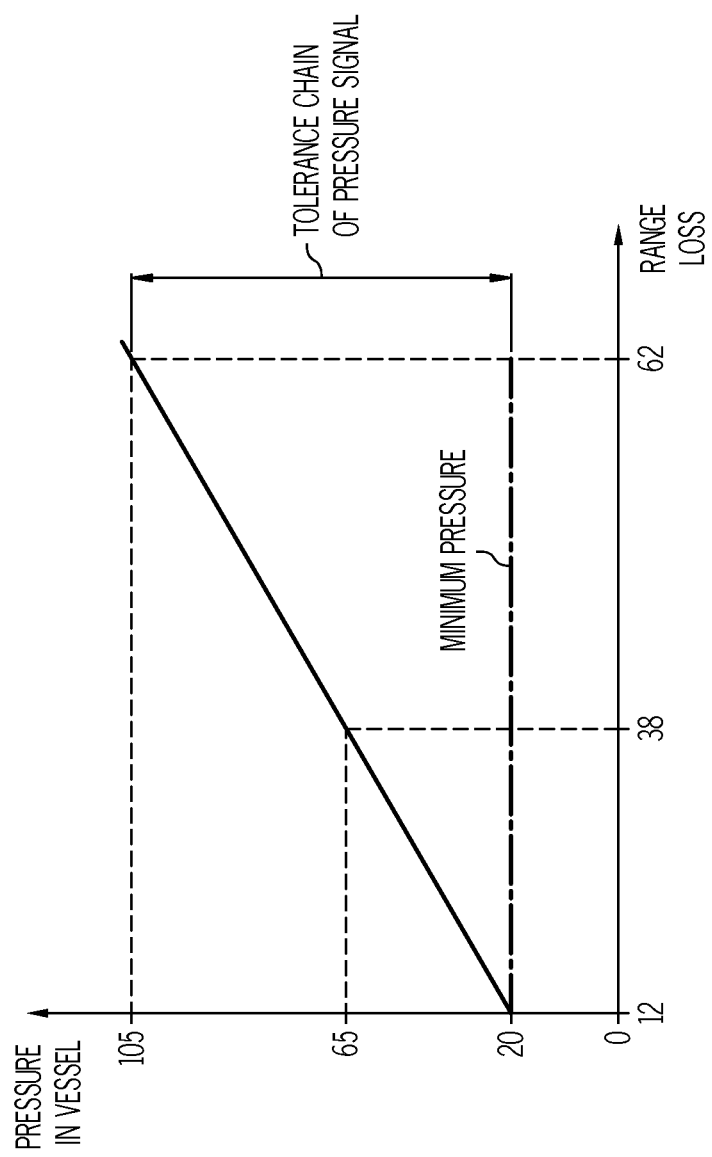
FIG. 1 is a graph showing the amount of range lost as a function of the pressure in the vessel.
Figure 2:
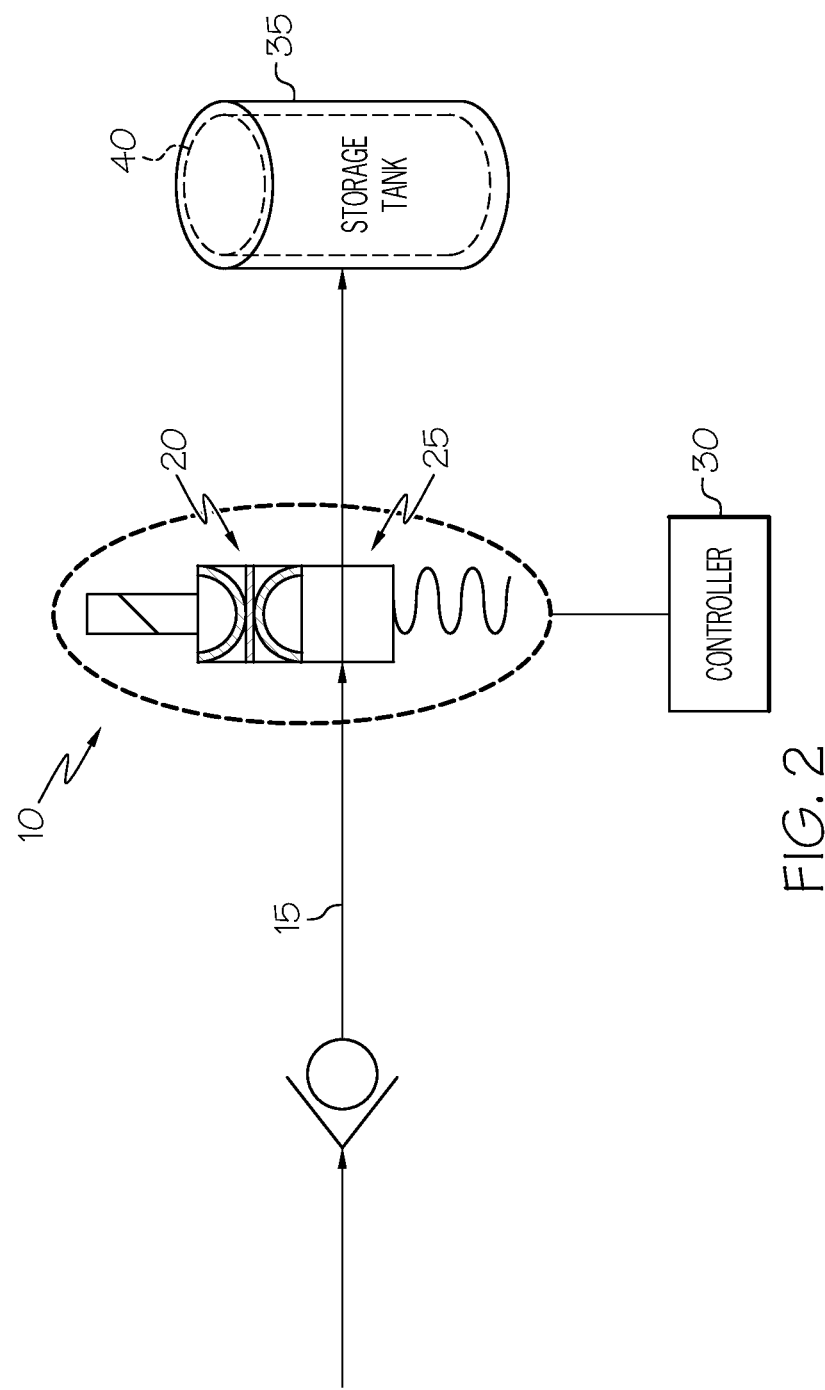
FIG. 2 is an illustration of the one embodiment of the invention.

As illustrated in FIG. 2, the vehicle is fitted with a vehicle controller 30, a storage tank 35 having a liner 40 therein, a nozzle 10 in the fueling line 15 that can switch between at least a flow reduction position 20 and a full fueling flow position 25. The nozzle is behind the back pressure valve which is closed by back pressure and opened by flow during fueling. The nozzle can be spring loaded or powered, for example. With a spring loaded nozzle, the default position when the actuator is not energized is the flow reduction position. A powered nozzle will open and close on command. The unpowered position would be the flow reduction position. For flow reduction, the orifice is calibrated so that the pressurization of the tank 35 of the tank system beginning from the lowest shutdown pressure (e.g., 5 bar) with full supply pressure (e.g., 800 bar) allows a slow pressurization to the minimum pressure where a flow reduction during fueling is not necessary (e.g., 20 bar) in a specified time (e.g., about 20 sec.) (see calculation below). When fueling is detected or the tank pressure for high rate fueling is reached, the vehicle controller 30 switches the valve from the flow reduction position to the full fueling flow position. The valve can be a two position valve as described above. Alternatively, the valve could have one or more additional positions, such as a shut-off position, if desired. Alternatively, the valve could be a proportional flow reduction valve, in which the orifice can be varied from at least a flow reduction position to a full flow position. The orifice could also act as a shutoff valve and completely close the flow.

The damage caused by improper fueling can be prevented. When the vehicle controller 30 is not in the fueling mode, the nozzle is set to the flow reduction position, and remains there throughout fueling. No liner damage is possible because the fueling is very slow.

In all other fueling modes, the vehicle controller 30 will be in the fueling mode. Fueling is started at a low pressure condition with the nozzle in the flow reduction position for a specified time (e.g., 20 sec) or until the desired pressure level is reached. The vehicle controller 30 detects fueling by pressure rise. There can be several pressure sensors in the storage tank 35. An increase in the pressure is determined by the vehicle controller 30 independent of the pressure signal tolerances. The tolerance on the pressure "movement" is much less than the absolute tolerance issue. When the time for safe pressure rise at low pressures is reached or when the pressure sensor indicates that the tank pressure is above the minimum pressure for high flow fueling, then the vehicle controller 30 will switch the valve to the full fueling flow position. The pressure increase in an empty vessel is not done in one large pressure jump from low pressure with full flow to high pressure. The flow peak at the beginning of fueling is reduced, which reduces the noise of fueling. The increase in mechanical stress from an essentially stressless situation to a high stress situation is stretched into a longer time frame.

Fueling can continue until it is completed, The fueling station can signal that the tank 35 is full and end fueling. Alternatively, the customer can stop or interrupt fueling at any time. There will be no liner damage, and the fueling time is minimized (the time is increased only by the amount of the initial slow fill time if any).

Figure 3:
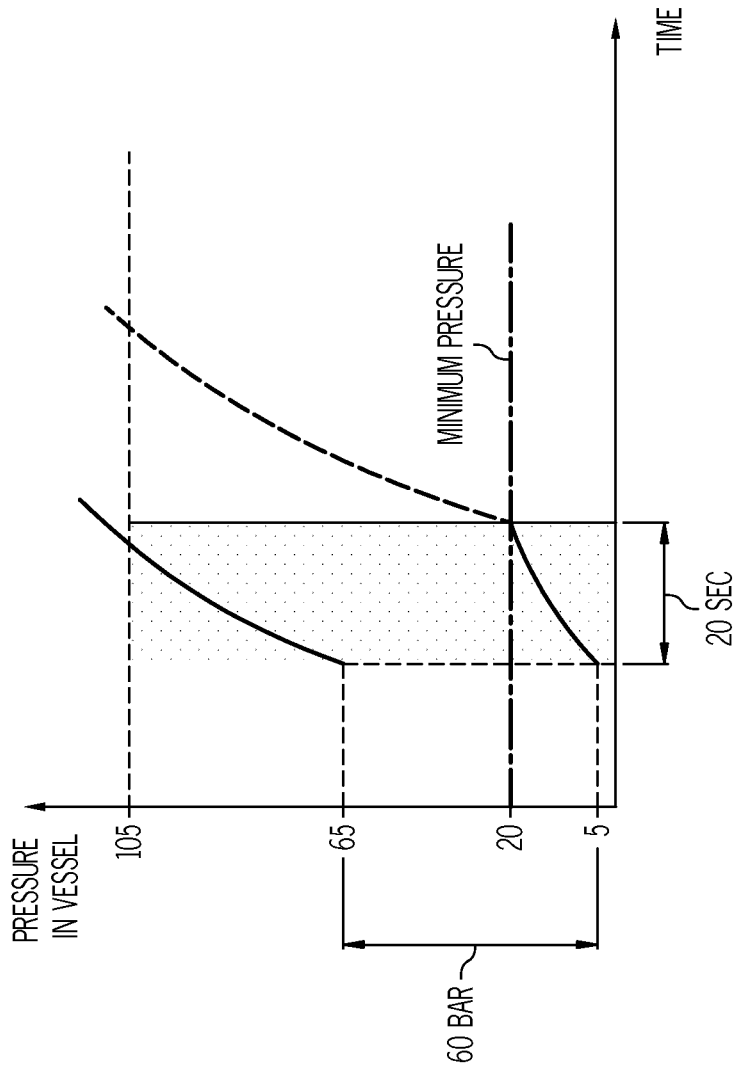
FIG. 3 is a graph showing a comparison of the current fueling process and the fueling process according to the present invention.

FIG. 3 shows a comparison of fueling under the present system and fueling using the flow reduction nozzle of the present invention. The time increase for fueling is about 20 seconds (or some other predetermined time period).

The size of the orifice can be determined as follows:
Select the lowest assumed tank pressure—e.g., 5 bar
Select the pressure level for full flow fueling—e.g., 20 bar
Density difference at the temperature—e.g., 20° C.–1.5 g/l
Tank volume—e.g., 117 l
Determine amount of $H_2$—e.g., about 180 g
Choose time to pressurize slowly—e.g., 20 sec
Fueling Pressure—800 bar
Determine flow reduction orifice—about 0.5 mm Although the discussion above referred to storage tanks 35 for vehicles, one of skill in the art will recognize that the invention applies to any compressed gas storage and refilling application whether mobile or stationary.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of reducing rupture damage to a liner of a fuel cell tank during fueling with compressed gas comprising:
   providing a supply of compressed gas;
   providing a storage tank defining the liner therein with a fueling line, and a nozzle in the fueling line, the nozzle movable between at least a flow reduction position and a full fuel flow position;
   providing a controller configured to determine a calculated tolerance margin comprising a minimum pressure, a signal tolerance, a degradation and a safety margin;
   using the calculated tolerance margin in conjunction with the controller to initiate a low pressure fueling from the supply of compressed gas with the nozzle in the flow reduction position until the minimum pressure of approximately 20 bar within the storage tank is obtained after which the nozzle is moved to the full fuel flow position to deliver a high pressure fueling;

fueling the storage tank from the supply of compressed gas with the nozzle in the full fuel flow position until fueling is completed wherein the initiating of the low pressure reduces a tendency of the liner to rupture through lower impact force between the liner and a surface of the fuel cell tank.

2. The method of claim 1 further comprising initiating fueling from the supply of compressed gas with the nozzle in the flow reduction position and maintaining the nozzle in the flow reduction position until fueling is completed.

3. The method of claim 1 wherein the nozzle is spring loaded.

4. The method of claim 1 wherein the nozzle is powered.

5. The method of claim 1 wherein the nozzle is a proportional flow reduction valve.

6. The method of claim 1 wherein moving the nozzle is controlled by the controller.

7. The method of claim 1 wherein storage tank is in a vehicle and wherein the compressed gas is hydrogen or natural gas.

8. A method of reducing rupture damage to a liner of a fuel cell tank during fueling with compressed gas comprising:
  providing a supply of compressed gas;
  providing a storage tank defining a liner therein with a fueling line, a nozzle in the fueling line, the nozzle movable between at least a flow reduction position and a full fuel flow position;
  providing a controller configured to determine a calculated tolerance margin comprising a minimum pressure, a signal tolerance, a degradation and a safety margin and for controlling the nozzle;
  using the calculated tolerance margin in conjunction with the controller to initiate a low pressure fueling from the supply of compressed gas with the nozzle in the flow reduction position until the minimum pressure of approximately 20 bar within the storage tank is obtained after which the nozzle is moved to the full flow position to deliver a high pressure fueling;
  determining if a pressure exceeds the minimum pressure;
  if the pressure exceeds the minimum pressure, moving the nozzle to the full fuel flow position to deliver a high pressure fueling, and initiating fueling from the supply of compressed gas with the nozzle in the full fuel flow position until fueling is complete;
  if the pressure does not exceed the minimum pressure, initiating the low pressure fueling from the supply of compressed gas with the nozzle in the flow reduction position until the minimum pressure is obtained;
  when the minimum pressure is obtained, moving the nozzle to the full fuel flow position to deliver the high pressure fueling; and
  fueling the storage tank from the supply of compressed gas with the nozzle in the full fuel flow position until fueling is completed wherein initiating the low pressure reduces a tendency of the liner to rupture through lower impact force between the liner and a surface of the fuel cell tank.

9. The method of claim 8 wherein the nozzle is spring loaded.

10. The method of claim 8 wherein the nozzle is powered.

11. The method of claim 8 wherein the nozzle is a proportional flow reduction valve.

12. The method of claim 8 wherein storage tank is in a vehicle and wherein the compressed gas is hydrogen or natural gas.

13. A vehicle fueled by hydrogen to reduce rupture damage to a liner of a fuel tank comprising:
  the vehicle having the fuel tank defining the liner therein with a fueling line, a nozzle in the fueling line flow, the nozzle movable between at least a flow reduction position and a full fuel flow position, and a controller configured to determine a calculated tolerance margin comprising a minimum pressure, a signal tolerance, a degradation and a safety margin and for controlling the nozzle wherein the calculated tolerance margin is used in conjunction with the controller to initiate a low pressure fueling from a supply of hydrogen with the nozzle in the flow reduction position until the minimum pressure of approximately 20 bar within the fuel tank is obtained after which the nozzle is moved to the full fuel flow position to deliver a high pressure fueling until fueling is complete wherein the initiating of the low pressure reduces a tendency of the liner to rupture through lower impact force between the liner and a surface of the fuel tank.

14. The vehicle of claim 13 wherein the nozzle is spring loaded.

15. The vehicle of claim 13 wherein the nozzle is a proportional flow reduction valve.

16. The vehicle of claim 13 wherein the fuel tank further comprises an outer layer made of a composite.

17. The vehicle of claim 16 wherein the composite is a carbon fiber matrix and wherein the liner is plastic or aluminum.

18. The vehicle of claim 13 wherein the nozzle is powered.

* * * * *